United States Patent
Pham

(10) Patent No.: US 12,299,787 B2
(45) Date of Patent: May 13, 2025

(54) IMAGE PROCESSING APPARATUS, IMAGE PROCESSING METHOD, AND COMPUTER PROGRAM PRODUCT

(71) Applicant: KABUSHIKI KAISHA TOSHIBA, Tokyo (JP)

(72) Inventor: Quoc Viet Pham, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 100 days.

(21) Appl. No.: 18/169,286

(22) Filed: Feb. 15, 2023

(65) Prior Publication Data

US 2023/0394724 A1 Dec. 7, 2023

(30) Foreign Application Priority Data

Jun. 7, 2022 (JP) ................................ 2022-092449

(51) Int. Cl.
*G06T 11/20* (2006.01)
*G06F 16/903* (2019.01)
*G06V 10/25* (2022.01)

(52) U.S. Cl.
CPC ...... *G06T 11/206* (2013.01); *G06F 16/90335* (2019.01); *G06V 10/25* (2022.01); *G06V 2201/07* (2022.01)

(58) Field of Classification Search
None
See application file for complete search history.

(56) References Cited

U.S. PATENT DOCUMENTS

| | | | | |
|---|---|---|---|---|
| 2018/0165830 | A1* | 6/2018 | Danieau | G06F 3/012 |
| 2018/0267996 | A1* | 9/2018 | Lin | G06T 11/60 |
| 2021/0342348 | A1* | 11/2021 | He | G06F 16/2246 |
| 2023/0115551 | A1* | 4/2023 | Jin | G06V 20/41 |
| | | | | 382/157 |

OTHER PUBLICATIONS

Li, J. et al. "Align before Fuse: Vision and Language Representation Learning with Momentum Distillation", NeurIPS 2021 (12 pages).
Selvaraju, R. et.al., "Grad-cam: Visual explanations from deep networks via gradient-based localization", ICCV, pp. 618-626, 2017 (9 pages).
Ren, S. et al. "Faster R-CNN: Towards Real-Time Object Detection with Region Proposal Networks," in IEEE Transactions on Pattern Analysis and Machine Intelligence, vol. 39, No. 6, pp. 1137-1149, Jun. 1, 2017 (9 pages).

* cited by examiner

*Primary Examiner* — Saptarshi Mazumder
(74) *Attorney, Agent, or Firm* — Oblon, McClelland, Maier & Neustadt, L.L.P.

(57) ABSTRACT

An image processing apparatus according to an embodiment includes a hardware processor. The processor receives input of an image and receives input of a query including one or more words. The processor calculates a word heat map for each of the words. The word heat map indicates a degree of relation between the word and each of subregions included in the image. The processor calculates weight of each of the words. The processor calculates, on the basis of the word heat maps and the weights, a query heat map indicating a degree of relation between the query and each of the subregions included in the image. The processor detects an image region from the image on the basis of the query heat map and outputs the image region. The image region corresponds to an object related to the query.

10 Claims, 7 Drawing Sheets

FIG.2
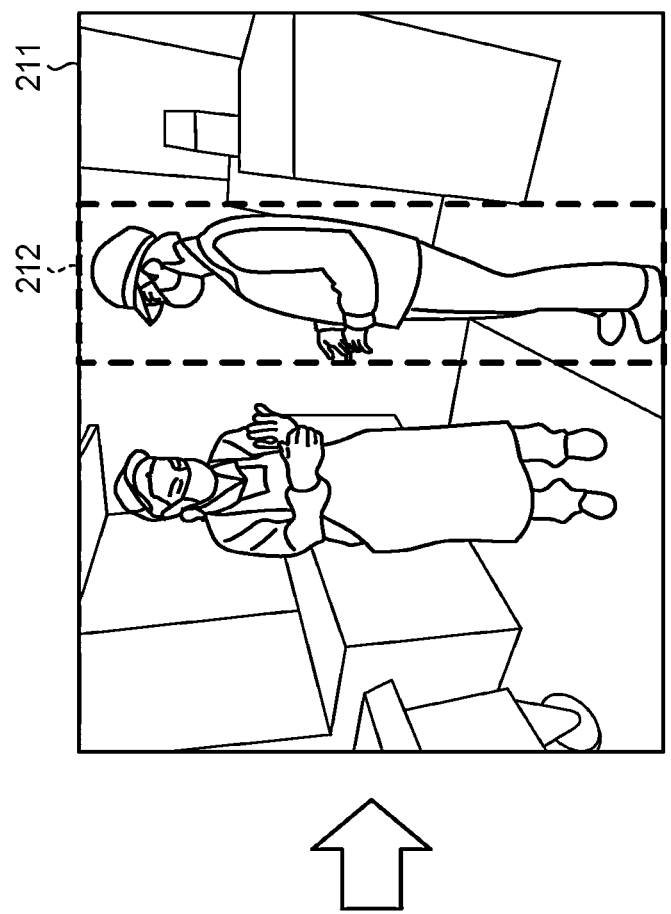
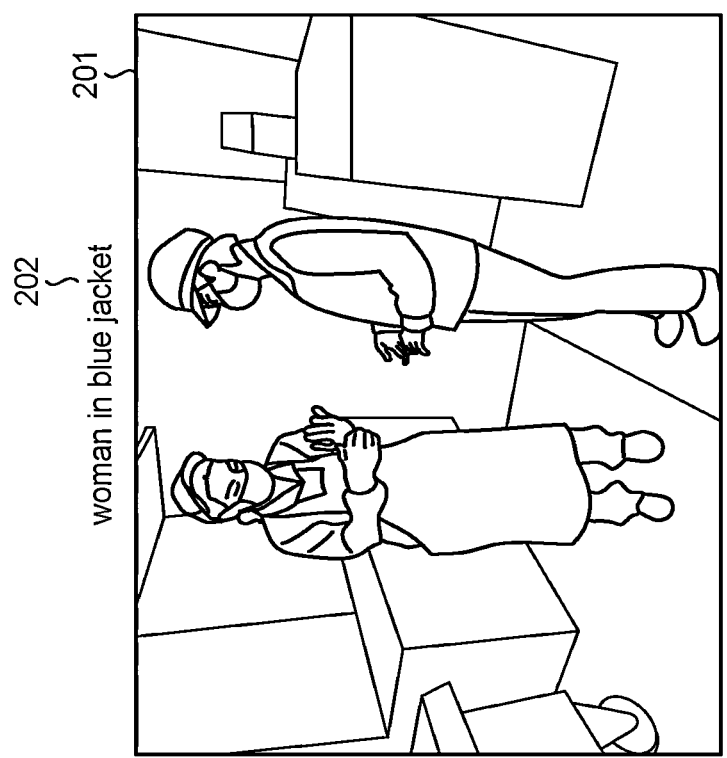

IMAGE PROCESSING APPARATUS, IMAGE PROCESSING METHOD, AND COMPUTER PROGRAM PRODUCT

CROSS-REFERENCE TO RELATED APPLICATIONS

This application is based upon and claims the benefit of priority from Japanese Patent Application No. 2022-092449, filed on Jun. 7, 2022; the entire contents of which are incorporated herein by reference.

FIELD

Embodiments described herein relate generally to an image processing apparatus, an image processing method, and a computer program product.

BACKGROUND

A technique is known for detecting an image region of an object that matches the text (query) input as a search condition from an input image.

For example, in a technique called weakly supervised visual grounding (VG), an image region (rectangle) corresponding to a query is detected when a certain image and a query are presented, by using a learning model that does not require the teaching of a rectangle corresponding to the image region of an object.

BRIEF DESCRIPTION OF THE DRAWINGS

FIG. 2 is a diagram illustrating an outline of processing executed with the image processing apparatus;

DETAILED DESCRIPTION

Figure 1:
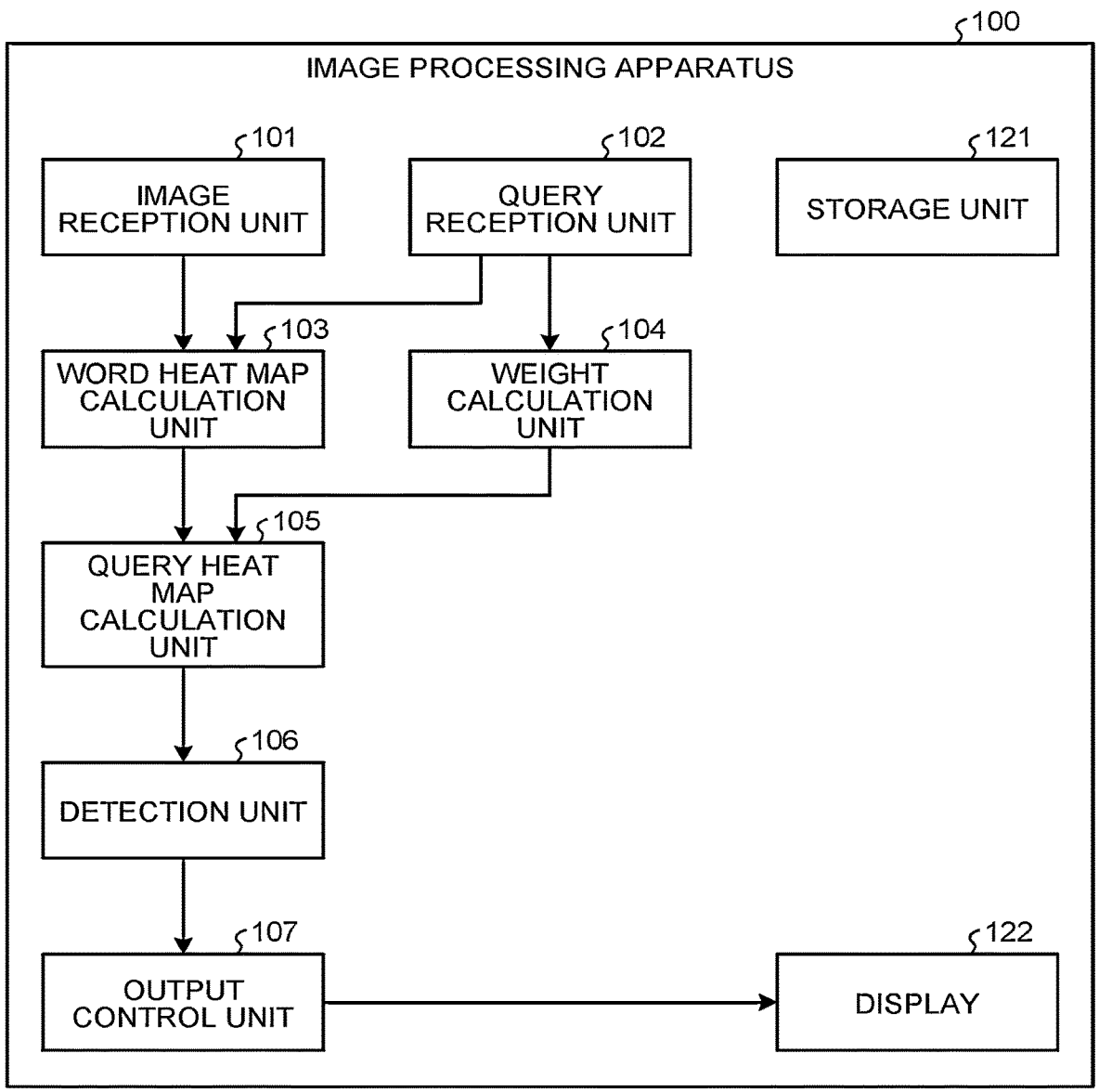
FIG. 1 is a block diagram of an image processing apparatus according to an embodiment.

An image processing apparatus according to one embodiment includes one or more hardware processors. The one or more hardware processors are configured to receive input of an image and receive input of a query including one or more words. The one or more hardware processors are configured to calculate a word heat map for each of the words. The word heat map indicates a degree of relation between the word and each of subregions included in the image. The one or more hardware processors are configured to calculate weight of each of the words. The one or more hardware processors are configured to calculate, on the basis of the word heat maps and the weights, a query heat map indicating a degree of relation between the query and each of the subregions included in the image. The one or more hardware processors are configured to detect an image region from the image on the basis of the query heat map and output the image region. The image region corresponds to an object related to the query.

A preferable embodiment of an image processing apparatus according to the present invention is described in detail below with reference to the accompanying drawings.

Weakly supervised VG can be performed by, for example, the following process.

A word heat map is calculated for each of words included in the query by using a pre-learned text/image matching model (e.g., a VG model with weakly supervised VG). A word heat map is information indicating the degree of relation (relevance) between each of subregions (e.g., one or more pixels) included in an image and a word.

The word heat maps of the respective words are summed up to calculate a heat map (query heat map) for the entire query.

Candidates of image region corresponding to an object are detected from the image.

From among the detected candidates, a candidate that matches the peak of the query heat map is specified, and the specified candidate is output as an image region corresponding to the object.

In the above process, all words included in the query are treated equally. In other words, words corresponding to a target object (main object) to be searched for in the query are not distinguished from words corresponding to objects (sub-objects) other than the target object. This may result in incorrect detection of a sub-object.

In the following embodiment, words corresponding to the main object and words corresponding to sub-objects can be distinguished by analysis of word dependencies. Thereafter, mutually different weights are assigned to the distinguished words. Moreover, the query heat map is redefined as a weighted sum of the word heat maps. For example, the weight of the word heat map for the word corresponding to the main object is emphasized (increased) in consideration of the relationship between the words. This enables accurate detection of the main object. Specifically, this configuration enables detection of a region corresponding to an object from an image by weakly supervised VG and other methods with higher accuracy.

FIG. 1 is a block diagram illustrating an example of a configuration of an image processing apparatus 100 according to the present embodiment. As illustrated in FIG. 1, the image processing apparatus 100 includes an image reception unit 101, a query reception unit 102, a word heat map calculation unit 103, a weight calculation unit 104, a query heat map calculation unit 105, a detection unit 106, an output control unit 107, a storage unit 121, and a display 122.

The image processing apparatus 100 detects and outputs, by using the above units, an image region (rectangle) from an input image that matches an input query. FIG. 2 is a diagram illustrating an outline of processing executed with the image processing apparatus 100.

An image 201 and a query 202 are input to the image processing apparatus 100. Although colors are not expressed in FIG. 2, suppose that the image 201 is, for example, an image in which a woman in a blue jacket is positioned on the right side and a person in clothes of colors other than blue is on the left side. The image processing apparatus 100 detects an image region 212 that matches the query 202, "woman in blue jacket," and displays it together with an image 211 on, for example, the display 122.

Details of each of the above units will be explained hereinafter with reference to FIG. 1. The storage unit 121 stores therein various types of information used with the image processing apparatus 100. For example, the storage unit 121 stores therein input images, input queries, and models used for calculation of heat maps.

The storage unit 121 can be formed of any commonly used storage medium, such as a flash memory, a memory card, a random access memory (RAM), a hard disk drive (HDD), and an optical disk.

Figure 3:
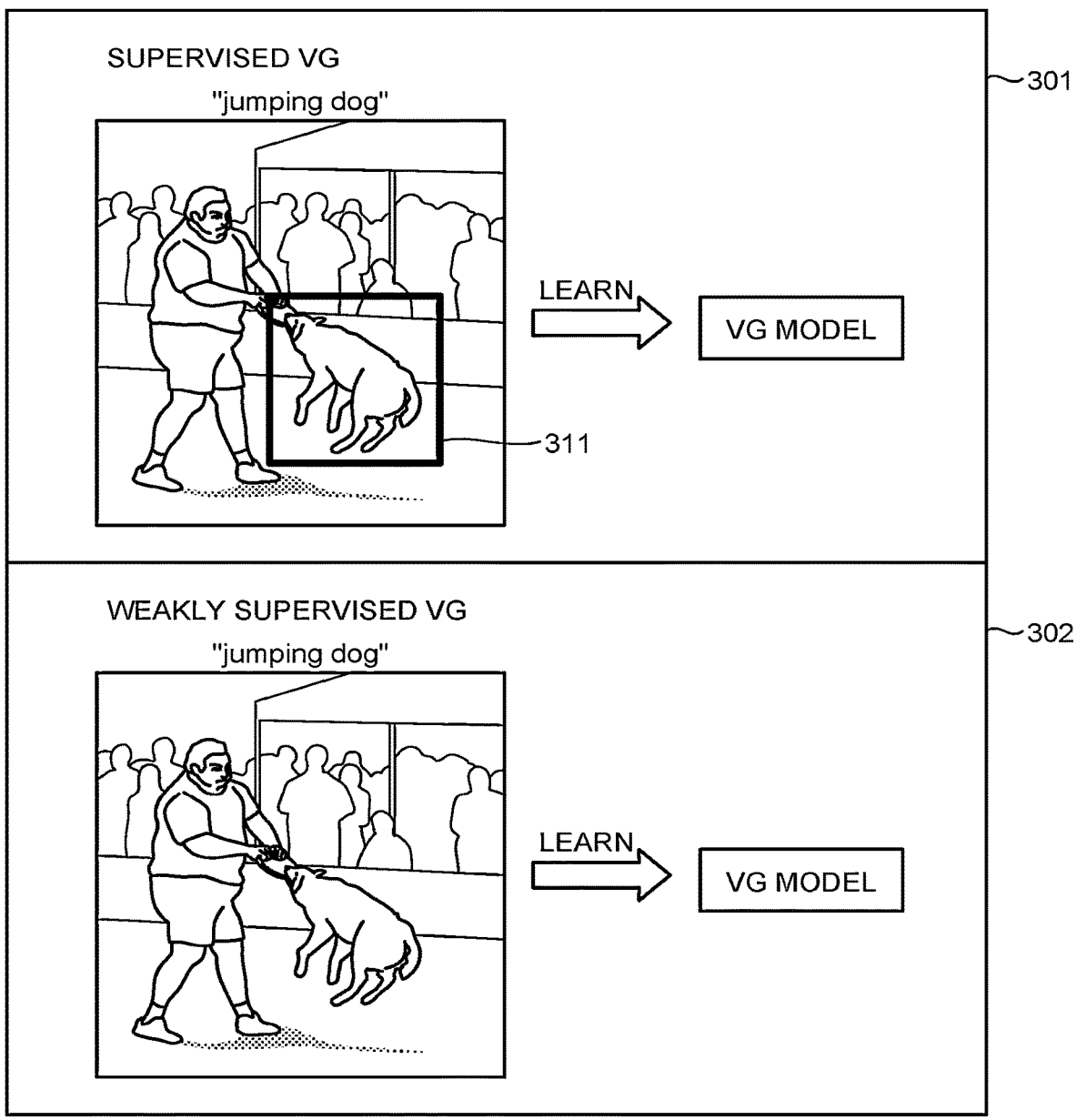
FIG. 3 is a diagram illustrating an example of processing of learning a model.

The following is an explanation of an example of a model that can be used in the present embodiment. FIG. 3 is a diagram illustrating an example of processing of learning a model. Processing 301 illustrates an example of VG model learning processing with supervised VG. Processing 302 is an example of VG model learning processing with weakly supervised VG.

In each processing, a VG model is learned by using an image including a dog and a query indicating "jumping dog". In supervised VG, a rectangle 311 is designated in the image, but supervised VG does not require teaching of a rectangle. Weakly supervised VG cannot learn a direct mapping from the query to an image region because of the lack of teaching of a rectangle. Instead, a target rectangle is estimated indirectly by using a heat map.

With reference to FIG. 1 again, the display 122 is a display device to display various types of information used in the image processing apparatus 100. The display 122 is implemented with, for example, a liquid crystal display or a touch panel.

The image reception unit 101 receives input of an image. Any method can be used as a method for inputting an image. For example, the method may be a method of receiving an image from an external device via a network and a method of reading a designated image out of images stored in a storage medium, such as the storage unit 121.

The query reception unit 102 receives input of a query including one or more words. Any method can be used as a method for inputting a query. For example, the method may be a method of receiving a query from an external device via a network and a method of receiving a query text input by the user using a keyboard or other input device.

The word heat map calculation unit 103 calculates a word heat map for each of words included in the query by using, for example, a VG model that has been learned in advance and stored in the storage unit 121. The words included in the query can be extracted by using a technique, such as morphological analysis. Each of the word heat maps may be calculated by any method. For example, Gradient-weighted Class Activation Mapping (GradCAM) can be used (See, Selvaraju et. al., "Grad-cam: Visual explanations from deep networks via gradient-based localization", ICCV, pp. 618-626, 2017).

Figure 4:
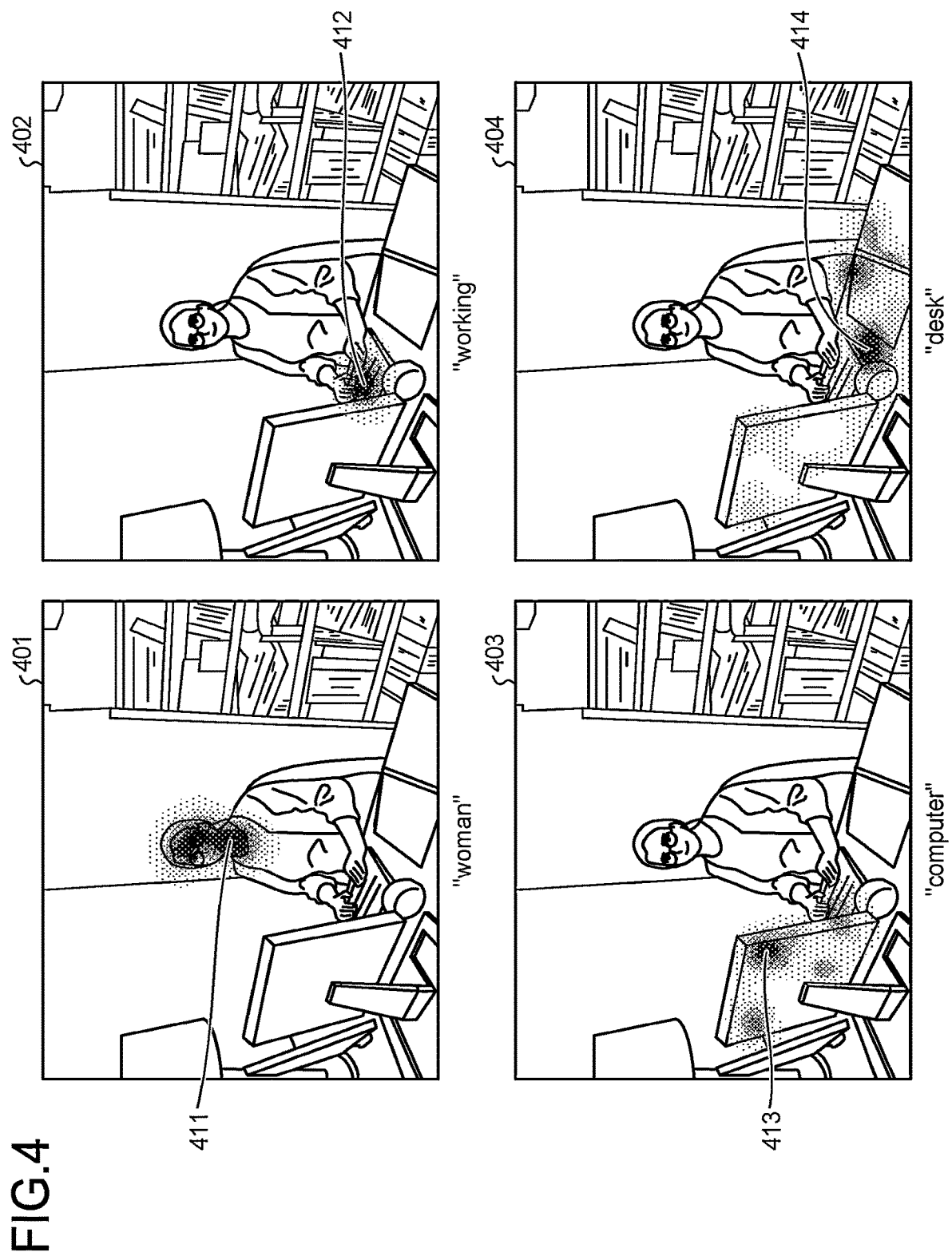
FIG. 4 is a diagram illustrating examples of word heat maps.

FIG. 4 is a diagram illustrating examples of calculated word heat maps. FIG. 4 illustrates examples of word heat maps calculated for some words (woman, working, computer, desk) of the words included in, for example, the query "the woman is working on her computer at the desk". In each of the heat maps in FIG. 4, the degree of relation between each of subregions and a word is indicated by the density of dark-colored dots. The degree of relation may be expressed by color differences or other means.

Images 401 to 404 are examples of images on which word heat maps calculated for the words "woman," "working," "computer", and "desk" are superimposed. The images 401 to 404 include word heat maps with peak portions 411 to 414, respectively. The peak portion is a portion including a region having the maximum degree of relation to the word.

For example, in the image 401, the peak portion 411 exists in a region close to the person's face being a region related to "woman".

With reference to FIG. 1 again, the weight calculation unit 104 calculates the weight of each of the words included in the query. First, the weight calculation unit 104 extracts one or more words WA (first word) corresponding to a main object and one or more words WB (second word) corresponding to a sub-object from the query by using, for example, one of the following two extraction methods.

Extraction Method M1

The weight calculation unit 104 searches the query for a specific word predetermined as a word connecting the main object and the sub-object. The specific word includes, for example, a preposition, such as "in", "holding", "carry", "with", "on", "by", and "near". In a case where the query includes a plurality of specific words, the weight calculation unit 104 searches for any one of the specific words (for example, the specific word that appears first).

The weight calculation unit 104 extracts one or more words appearing before the specific word and one or more words appearing after the specific word in the query as words WA and WB, respectively.

Extraction Method M2

The weight calculation unit 104 finds, on the basis of dependency structure analysis, a tree structure indicating a dependency structure among the words included in the query. The weight calculation unit 104 extracts, as words WA, a word corresponding to the root of the tree structure and words related to the word of the root. Additionally, the weight calculation unit 104 extracts, as words WB, words other than the words WA.

The weight calculation unit 104 detects words (the words WA) related to the main object from the query by using, for example, dependency analysis of spaCy that is a natural language processing library applied as open source. Words related to the main object may include not only a word corresponding to the root of the tree structure, but also words modifying the word, for example.

Dependencies in a sentence are dependencies between words and phrases. Dependencies are modifier/modified relationships and dependency relations. Analyzing the dependencies of a sentence is called dependency structure analysis. Dependency structures are often represented by tree structures. This tree structure includes words and clauses as nodes. Clauses and words are expressed in a modifier/modified parent-child relationship.

Figure 5:
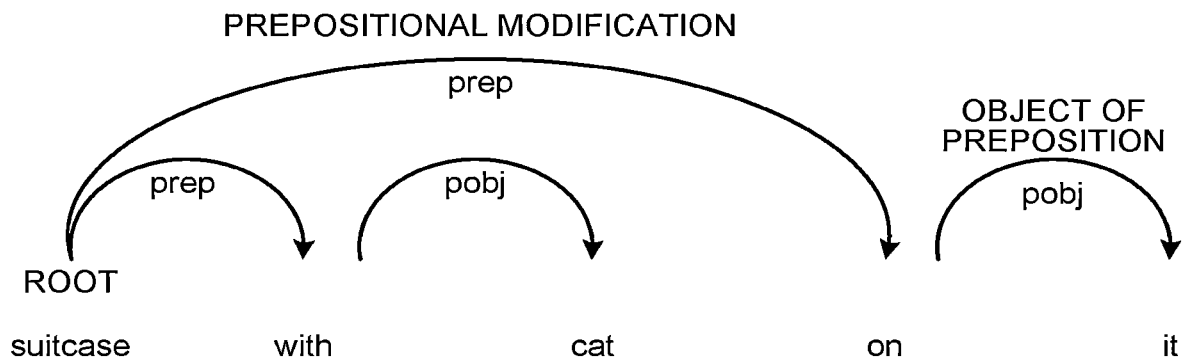
FIG. 5 is a diagram illustrating an example of results of dependency structure analysis.

FIG. 5 is a diagram illustrating an example of results of dependency structure analysis. FIG. 5 illustrates an example of results of dependency structure analysis for the query "suitcase with cat on it". In this example, the word "suitcase" is the word corresponding to the root and is extracted as the word WA. If, for example, any word, such as "white suitcase" modifying the word "suitcase", is included in the query, such a word is also extracted as the word WA. Words other than the words WA are extracted as words WB.

With reference to FIG. 1 again, the weight calculation unit 104 calculates different weights between words WA and WB. For example, the weight calculation unit 104 calculates the weight of each of the words such that the weight of the words WA calculated by the extraction method M1 or M2 is larger than the weight of the words WB. For example, the weight calculation unit 104 calculates weight "m (w)=α (α>1)" for all the words WA and weight "m (w)=1" for the words WB. In this manner, the weight calculation unit 104 emphasizes the weight of the words WA corresponding to the main object.

The query heat map calculation unit 105 calculates the query heat map on the basis of the word heat maps and the weights. The query heat map corresponds to information indicating the degree of relation between each subregion included in the image and the query. For example, the query heat map calculation unit 105 calculates the query heat map by weighted summing of the word heat maps using weights.

Expression (1) described below represents an example of calculation of a query heat map Heatmap (q). Symbol q represents a query. Heatmap (w) represents the word heatmap for a word w. Sum (Σ) means calculating the sum for all the words w.

$$\text{Heatmap}(q) = \Sigma(m(w) \times \text{Heatmap}(w)) \quad (1)$$

As described above, the value of the weight of the word corresponding to the main object is calculated to be larger. Therefore, the query heat map is calculated such that subregion related to the main object is emphasized. This results in accurate detection of the main object.

The detection unit 106 detects an image region corresponding to the object related to the query from the input image on the basis of the query heat map. For example, the detection unit 106 first detects one or more candidates of image region corresponding to one or more objects from the image. A method using Region Proposal Networks (See, Ren et. al, "Faster R-CNN: Towards Real-Time Object Detection with Region Proposal Networks," in IEEE Transactions on Pattern Analysis and Machine Intelligence, vol. 39, no. 6, pp. 1137-1149, 1 Jun. 2017) can be applied as a method for detecting candidates of image region.

From among one or more candidates of image region, the detection unit 106 detects a candidate including subregions (e.g., pixels) indicated by the query heat map to have a large degree of relation to the query as an image region corresponding to the object related to the query. For example, the detection unit 106 detects a candidate that most matches the peak of the query heat map in the candidates of image region.

The method for detecting an image region is not limited to the above, but can be any method as long as it is a method using a query heat map. For example, the detection unit 106 may detect an image region by using a model having been learned so as to receive the query heat map and output an image region.

The output control unit 107 controls output of various types of information used with the image processing apparatus 100. For example, the output control unit 107 outputs (displays) the image region detected by the detection unit 106 to (on) the display 122.

The image region to be output may be only the image region corresponding to the main object, but the image region corresponding to the sub-object may also be output.

In this case, the weight calculation unit 104 calculates weights by multiple patterns that are mutually different in weight of the word WA and the word WB. The following is an example with two patterns.

Pattern P1: Weight m (w) of the word WA=α (α>1); weight m (w) of the word WB=1
Pattern P2: Weight m (w) of the word WB=α (α>1); weight m (w) of the word WA=1

The query heat map calculation unit 105 calculates query heat maps corresponding to the multiple patterns. The detection unit 106 detects image regions corresponding to the query heat maps. The output control unit 107 outputs the image regions detected like this, which correspond to the multiple patterns. The output control unit 107 may output the image regions in mutually different modes. For example, the output control unit 107 displays, in different colors, a rectangle that surrounds the image region corresponding to the main object and a rectangle that surrounds the image region corresponding to the sub-object. The mode of output is not limited to color, but can be any other mode, such as line thickness, description, and a blinking way of the rectangle.

Each of the above units (the image reception unit 101, the query reception unit 102, the word heat map calculation unit 103, the weight calculation unit 104, the query heat map calculation unit 105, the detection unit 106, and the output control unit 107) is implemented by one or more hardware processors. For example, each of the above units may be implemented by causing a hardware processor, such as a central processing unit (CPU) to execute a computer program, namely, implemented by software. Each of the above units may be implemented by a dedicated integrated circuit (IC) or other processor, namely, implemented hardware. Each of the above units may be implemented using software and hardware in combination. When multiple processors are used, each of the processors may implement one of the units or two or more of the units.

Figure 6:
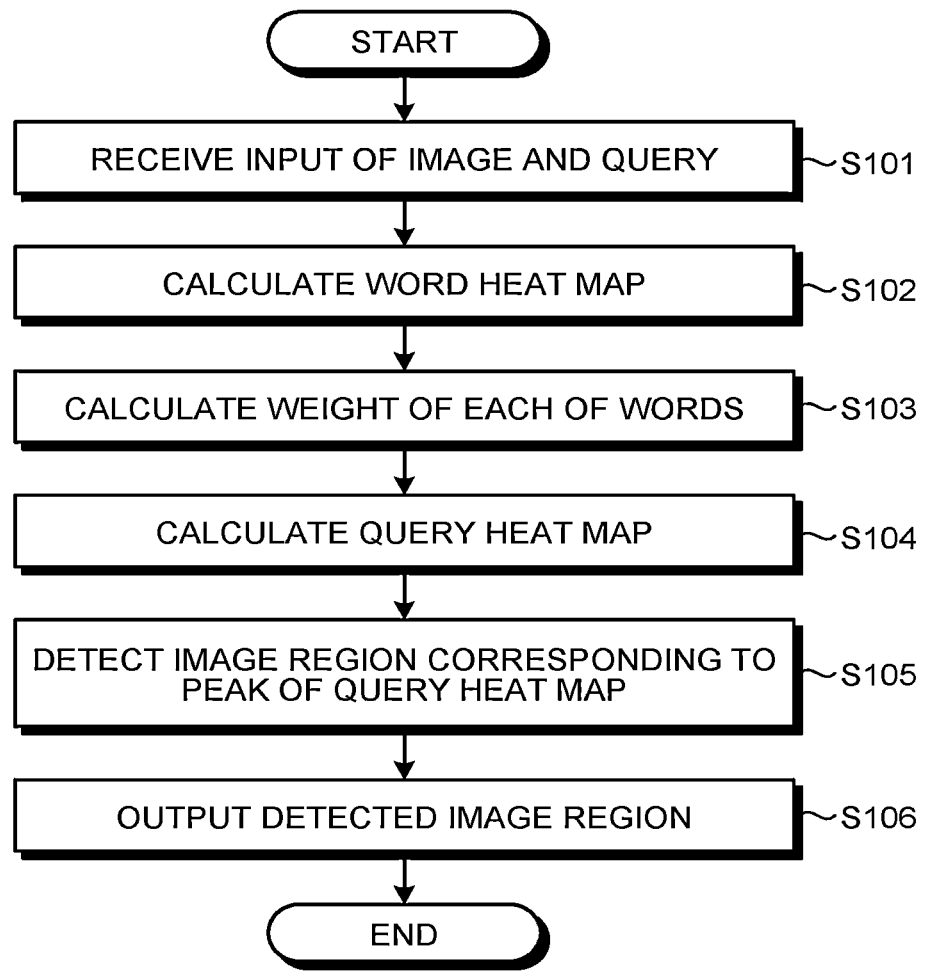
FIG. 6: is a flowchart of image processing according to the embodiment.

The following is an explanation of image processing executed with the image processing apparatus 100 according to the present embodiment. FIG. 6 is a flowchart illustrating an example of image processing according to the present embodiment.

The image reception unit 101 receives input of an image and the query reception unit 102 receives input of a query (Step S101). The word heat map calculation unit 103 calculates a word heat map for each of words included in the query by using the input image (Step S102).

The weight calculation unit 104 calculates weight for each of the words included in the query (Step S103). The query heat map calculation unit 105 calculates a query heat map by weighted summing using the word heat maps and the corresponding weights (Step S104).

The detection unit 106 detects an image region corresponding to the peak of the query heat map from the input image (Step S105). The output control unit 107 outputs the detected image region to, for example, the display 122 (Step S106) and ends the image processing.

Figure 7:
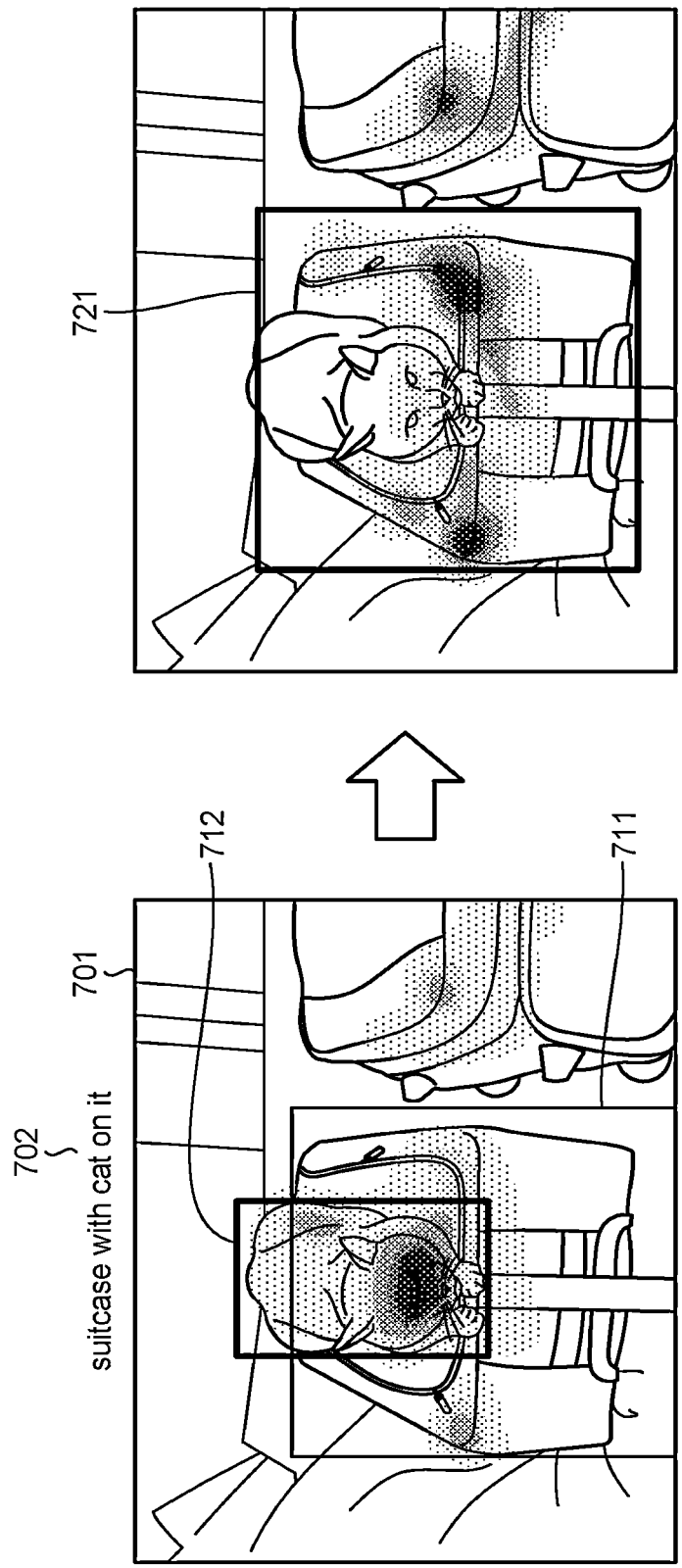
FIG. 7 is a diagram illustrating an example of output with an output control unit.

FIG. 7 is a diagram illustrating an example of output with the output control unit 107. FIG. 7 illustrates an example of output in a case where an image 701 and a query 702 "suitcase with cat on it" are input. The word "suitcase" is a word corresponding to the target object (main object) to be searched for in the query 702, and the word "cat" is a word corresponding to an object (sub-object) other than the target object.

The left side of the arrow represents an example of output using a query heat map calculated without using the method of the present embodiment (without using word weights). In this case, the peak of the query heat map is located close to the cat's head, so that a rectangle 712 surrounding the cat is output as the detected image region. A rectangle 711 corresponds to an image region that corresponds to the main object ("suitcase") and should be originally output.

The right side of the arrow illustrates an example of output using a query heat map calculated using word weights according to the method of the present embodiment. According to the present embodiment, the weight of the word "suitcase" corresponding to the main object is calculated to be large, and as a result, the peak of the query heat map is located close to the corners of the suitcase. With this configuration, a rectangle 721 indicating the image region corresponding to the main object ("suitcase") can be correctly detected.

In this manner, the image processing apparatus according to the present embodiment analyzes the word dependencies, calculates the weight of each of the words, and calculates the query heat map as the weighted sum of the word heat maps. By using the query heat map calculated in this manner, a region corresponding to an object can be more accurately detected from an image.

Figure 8:
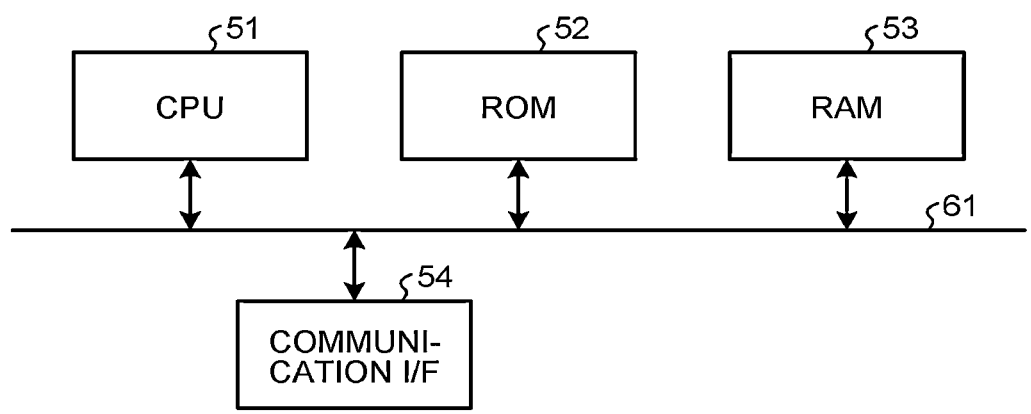
FIG. 8 is a hardware configuration diagram of the image processing apparatus according to the embodiment.

The following is an explanation of a hardware configuration of the image processing apparatus according to the present embodiment with reference to FIG. 8. FIG. 8 is an explanatory drawing illustrating an example of a hardware configuration of the image processing apparatus according to the embodiment.

The image processing apparatus according to the embodiment includes a control device, such as a CPU 51, a storage device, such as a read only memory (ROM) 52 and a RAM 53, a communication OF 54 connecting to a network to execute communication, and a bus 61 connecting the units.

The image processing apparatus may be formed of single physical hardware (e.g., personal computer, server, etc.) or a combination of two or more units of physical hardware. The image processing apparatus may be constructed as a server or other device on a cloud environment.

A computer program to be executed with the image processing apparatus according to the embodiment is provided in a form of being pre-installed in the ROM 52 or the like.

The computer program to be executed with the image processing apparatus according to the embodiment may be configured to be provided as a computer program product in an installable or executable format file recorded on a computer readable storage medium, such as a compact disc read only memory (CD-ROM), a flexible disk (FD), a compact disc recordable (CD-R), a digital versatile disc (DVD), etc.

Moreover, the computer program to be executed with the image processing apparatus according to the embodiment may be configured to be stored on a computer connected to a network, such as the Internet, and provided by being downloaded via a network. It may also be configured to provide or distribute the computer program to be executed with the image processing apparatus according to the embodiment via a network, such as the Internet.

The computer program to be executed with the image processing apparatus according to the embodiment can cause a computer to function as the units of the image processing apparatus described above. The computer is capable of executing the computer program by reading the computer program with the CPU 51 from a computer-readable storage medium onto its main memory.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
   one or more hardware processors configured to:
   receive input of an image;
   receive input of a query including one or more words;
   calculate a word heat map for each of the words, the word heat map indicating a degree of relation between the word and each of subregions included in the image;
   calculate weight of each of the words;
   calculate, on the basis of the word heat maps and the weights, a query heat map indicating a degree of relation between the query and each of the subregions included in the image;
   detect an image region from the image on the basis of the query heat map, the image region corresponding to an object related to the query; and
   output the image region, wherein
   the query includes a plurality of the words, and
   the one or more hardware processors are configured to:
   find, on the basis of dependency structure analysis, a tree structure indicating a dependency structure among the words included in the query; and
   calculate different weights between a first word and a second word other than the first word, the first word being related to the word corresponding to a root of the tree structure.

2. The image processing apparatus according to claim 1, wherein
   the one or more hardware processors are configured to:
   detect a predetermined specific word in the query; and
   calculate different weights between one or more first words and one or more second words, the one or more first words appearing before the specific word in the query, the one or more second words appearing after the specific word in the query.

3. The image processing apparatus according to claim 2, wherein the one or more hardware processors are configured to calculate the weight of the first words to be larger than the weight of the second words.

4. The image processing apparatus according to claim 1, wherein the one or more hardware processors are configured to calculate the weight of the first word to be larger than the weight of the second word.

5. The image processing apparatus according to claim 1, wherein the one or more hardware processors are configured to calculate the query heat map by weighted summing of the word heat maps using the weights.

6. The image processing apparatus according to claim 1, wherein the one or more hardware processors are configured to:
   detect, from the image, one or more candidates of image region corresponding to one or more objects; and
   detect, from among the one or more candidates of image region, a candidate including a subregion indicated by the query heat map to have a large degree of relation to the query, the candidate being detected as the image region corresponding to the object related to the query.

7. The image processing apparatus according to claim 1, wherein the one or more hardware processors are configured to perform the detection of the image region by using a model having been learned to receive the query heat map and output the image region corresponding to the object related to the query.

8. The image processing apparatus according to claim 1, wherein the one or more hardware processors are configured to:
   perform the calculation of the weight of each of the words by multiple patterns, the patterns being mutually different in weight of each word;

calculate a plurality of query heat maps corresponding to the multiple patterns;
detect a plurality of image regions corresponding to the plurality of query heat maps; and
output the plurality of image regions.

9. An image processing method implemented by a computer, the method comprising:
receiving input of an image;
receiving input of a query including one or more words;
calculating a word heat map for each of the words, the word heat map indicating a degree of relation between the word and each of subregions included in the image;
calculating weight of each of the words;
calculating, on the basis of the word heat maps and the weights, a query heat map indicating a degree of relation between the query and each of the subregions included in the image;
detecting an image region from the image on the basis of the query heat map, the image region corresponding to an object related to the query; and
outputting the image region, wherein
the query includes a plurality of the words, and
the calculating the weight includes
finding, on the basis of dependency structure analysis, a tree structure indicating a dependency structure among the words included in the query; and
calculating different weights between a first word and a second word other than the first word, the first word being related to the word corresponding to a root of the tree structure.

10. A computer program product comprising a non-transitory computer-readable recording medium on which programmed instructions are recorded, the instructions causing a computer to execute processing, the processing including:
receiving input of an image;
receiving input of a query including one or more words;
calculating a word heat map for each of the words, the word heat map indicating a degree of relation between the word and each of subregions included in the image;
calculating weight of each of the words;
calculating, on the basis of the word heat maps and the weights, a query heat map indicating a degree of relation between the query and each of the subregions included in the image;
detecting an image region from the image on the basis of the query heat map, the image region corresponding to an object related to the query; and
outputting the image region, wherein
the query includes a plurality of the words, and
the calculating the weight includes
finding, on the basis of dependency structure analysis, a tree structure indicating a dependency structure among the words included in the query; and
calculating different weights between a first word and a second word other than the first word, the first word being related to the word corresponding to a root of the tree structure.

* * * * *